March 7, 1939. J. P. SPANG 2,149,407
MEAT-SLITTING MACHINE
Filed Oct. 22, 1936 2 Sheets-Sheet 1

Inventor.
Joseph P. Spang
by Heard Smith & Tennant.
Attys.

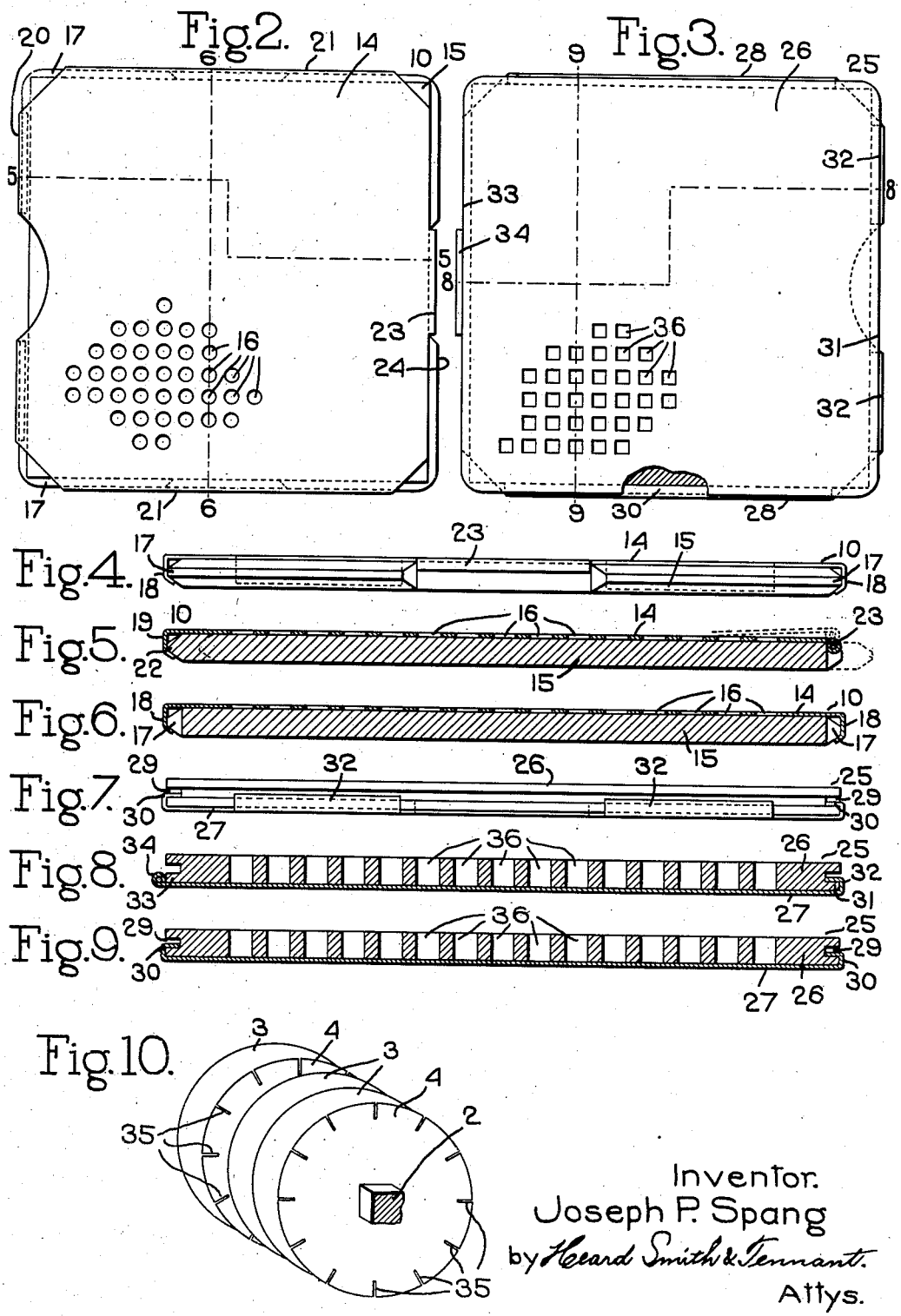

Patented Mar. 7, 1939

2,149,407

UNITED STATES PATENT OFFICE 2,149,407

MEAT-SLITTING MACHINE

Joseph P. Spang, Quincy, Mass.

Application October 22, 1936, Serial No. 106,933

2 Claims. (Cl. 17—27)

This invention relates to meat-slitting machines and particularly to meat-slitting machines of the type in which the meat to be slit is carried by a meat-supporting plate which is separable from the machine and is adapted to have a free unrestrained movement over a supporting platform to carry the meat past the slitting knives, and is further constructed so that after the plate has moved past the knives, it, with the slit meat thereon, is discharged from the machine.

In meat-slitting machines of this type the knives are usually driven at a relative high speed and the action of the rapidly-rotating knives on the meat not only slits the latter but also serves to feed it and the meat-supporting plate past the knives. After continued use the surface of the meat-supporting plate often becomes slippery by the accumulation thereon of fat from the meat so that sometimes the frictional engagement of the meat with the plate is not sufficient to prevent the slice of meat from being pulled off the plate by the rapidly-moving knives. Then again if the slice of meat contains some fat the friction between the knives and the meat is reduced so that the knives have very little, if any, feeding effect on the meat.

It is one of the objects of my present invention to provide a novel meat-supporting plate for a meat-slitting machine of this type which can be readily cleaned and which provides increased resistance to the meat sliding off from the plate during the meat-slitting operation.

A further object of the invention is to provide improvements by which the rotation of the knives will serve to assist in feeding the meat forward even though the latter contains more or less fat.

In order to give an understanding of the invention I have illustrated in the drawings some selected embodiments thereof which will now be described, after which the novel features will be pointed out in the appended claims.

In the drawings,

Fig. 2 is a top plan view of one form of meat-supporting plate embodying the invention;

Fig. 3 is a similar view of a meat-supporting plate embodying the invention having a different construction from that shown in Fig. 2;

Fig. 4 is an edge view of Fig. 2 looking toward the left;

Fig. 5 is a section on the line 5—5, Fig. 2;

Fig. 6 is a section on the line 6—6, Fig. 2;

Fig. 7 is an edge view of Fig. 3 looking toward the left;

Fig. 8 is a section on the line 8—8, Fig. 3;

Fig. 9 is a section on the line 9—9, Fig. 3;

Fig. 10 is a fragmentary perspective view of the rotary cutters.

Figure 1:
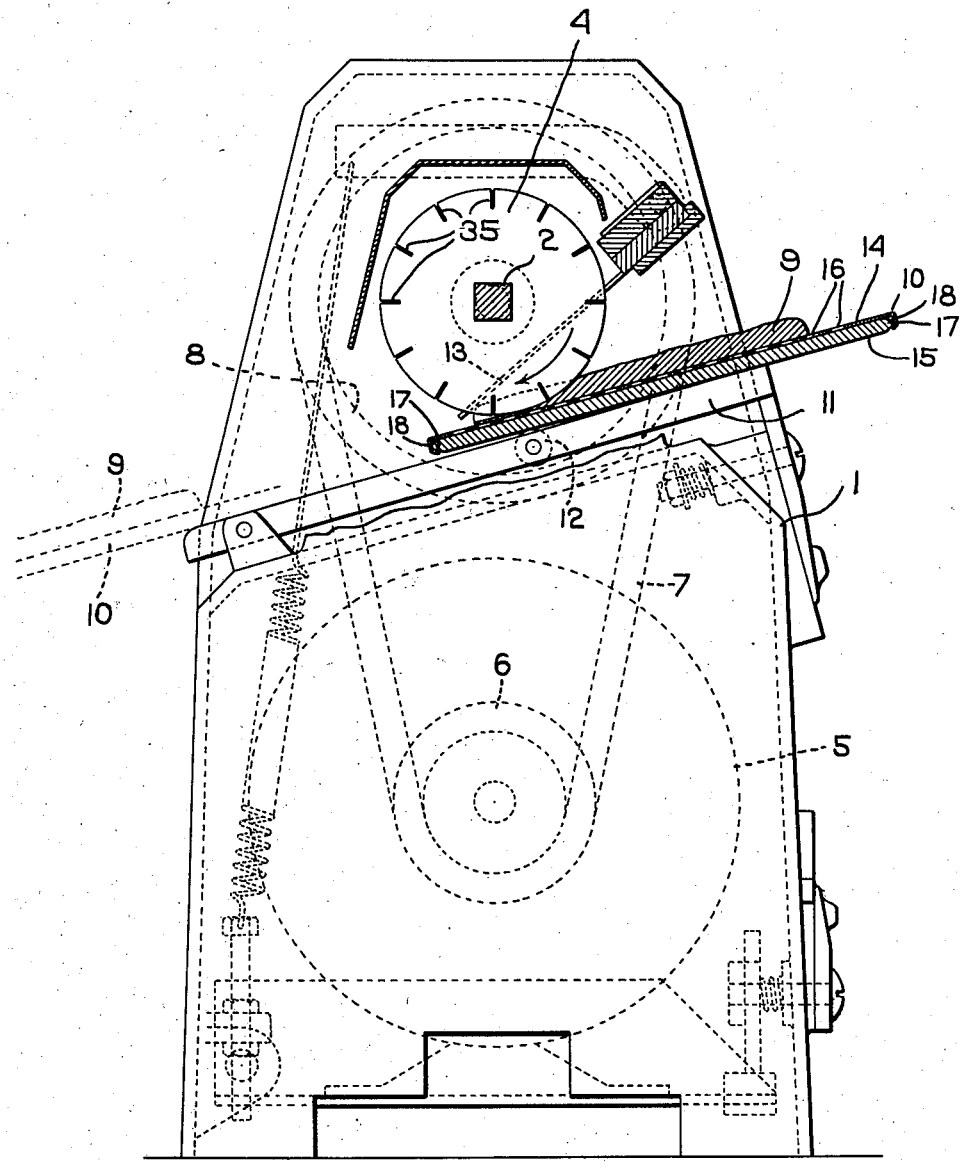
Fig. 1 is a view partly in section showing a meat-slitting machine embodying my invention.

The meat-slitting machine shown in Fig. 1 is of the general type illustrated in my co-pending application, Serial No. 91,676, filed July 21, 1936.

This machine comprises a suitable supporting frame 1 in which is journalled a cutter-supporting shaft 2, said shaft having a plurality of rotary cutters 3, 4 thereon. These cutters are spaced apart the distance desired for the spacing of the slits in the meat. The shaft 2 is shown as driven from a suitable motor 5 supported by the frame 1, for which purpose the motor shaft has a pulley 6 thereon which is connected by a belt 7 with a pulley 8 on the shaft 2.

The slice of meat 9 to be slit is supported on a suitable meat-supporting plate indicated generally at 10 and which, like that shown in my said co-pending application, is separable from the machine and is adapted to be introduced into the machine at one side of the knives 3, 4 and to have a free unrestrained movement past the knives to the other side thereof and then to be discharged from the machine on said other side. The machine is shown as having a suitable plate-supporting portion 11 over which the plate has its free unrestrained movement, and in the embodiment herein shown said supporting member 11 is provided with a roll 12 situated beneath the knives and over which the meat-supporting plate 10 rolls in its travel past the knives. The meat-supporting plate 10 with the slice of meat 9 thereon is introduced into the machine at the right-hand end of the support 11 and said plate 10 has its free unrestrained movement toward the left past the knives, during which movement the knives cut the slits in the meat. The movement of the plate carries it completely past the knives and said plate is discharged from the machine at the left-hand side, as shown in dotted lines in Fig. 1.

13 indicates a stripper member of the type shown in my co-pending application Serial No. 91,676 and which yieldingly engages the meat as it is moved past the knives and which serves to prevent the meat from being picked up from the plate by the knives.

Since the knives are rotating relatively rapidly in the direction of the arrow Fig. 1, the engagement of the knives with the meat tends to pull the meat forward and thus assist in the feeding movement of the meat 9 and the meat-supporting plate 10. In order to increase the frictional contact between the slice of meat 9 and the plate 10 so as to prevent said slice from being pulled off from the plate by the rotation of the knives, I propose to make the meat-supporting plate in two layers or plies, the upper one of which is perforated to provide pockets into which the meat is forced. These two plies are detachably secured together so that they can be readily separated when they are to be cleaned. In Figs. 1, 2, 5 and 6 the two plies or plate members are indicated at 14 and 15 respectively. The member 14 is shown as made of sheet metal provided with perforations 16 and the plate member 15 may be of wood or fibre or any other suitable material. On the two opposite edges 21 of the plate 10 the plate member 15 is formed with the two guiding ribs 17 and the plate member 14 is formed with open-ended channels to slidingly receive the rib. These channels are provided by the edge portions 18 of the plate member 14 which are bent around the ribs as best seen in Figs. 4 and 6. The two plate members are assembled by sliding the guiding ribs 17 of the plate member 15 into the lips 18 of the plate member 10. Said plate members are held in their assembled relation by a lip 19 on the edge 20 of the plate which partially embraces a rib 22 on the plate member 15 and by a bead 23 on the plate member 14 at the edge 24 of the plate, which bead engages the corresponding edge of the plate member 15 as shown in Fig. 5. The plate member 14 is somewhat resilient so that when the plate members are to be separated the beaded portion of the plate member 14 may be raised, as shown in dotted lines Fig. 5, so as to free the bead from the edge of the plate member 15, after which the plate member 15 can be withdrawn from the guiding ribs 18 as indicated by dotted lines Fig. 5.

Whenever it is necessary to clean the meat-supporting plate the two plate members can be readily separated and cleaned independently much more effectively than they could be cleaned if they were retained in their superposed relation.

Another embodiment of the invention is shown in Figs. 3, 7, 8 and 9. In this embodiment the perforations are formed in the thicker plate member which may be of wood, fibre or other material instead of in the sheet metal plate member. The meat-supporting plate shown in Figs. 3, 7, 8 and 9 is indicated at 25 and it comprises the two plate members 26 and 27, the former being relatively thick and formed of wood, fibre or some similar material, and the latter being made of sheet metal. In this embodiment of the invention the plate member 26 is provided with perforations 36 while the plate member 27 is non-perforated. In using this embodiment of the invention the meat is supported on the plate member 26 and the perforations 36 form pockets into which the meat is crowded, thereby increasing the frictional contact between the slice of meat and its supporting plate. Each of the sides 28 of the meat-supporting plate is provided with a guiding channel or groove 29 in which is received a rib or lip 30 formed on the corresponding edge of the plate member 27. On the edge 31 of the meat-supporting plate 25 the plate member 27 is formed with a stop projection 32 to engage the corresponding edge of the plate member 26, and on the edge 33 of the meat-supporting plate 25 the sheet metal plate member 27 is formed with a bead 34 which snaps over the corresponding edge of the plate member 26 thereby holding the plate members in their assembled relation. The plate members can be separated by forcing the beaded portion of the metallic plate member backwardly to release the bead 34 from the edge of the plate member 26 and then sliding the plate members on each other to separate them.

My improved meat-supporting plate is thus provided with a series of pockets in its meat-supporting face which serve to increase the frictional engagement between the plate and the meat, but because of the fact that the plate is made up of the two separable plate members the cleaning of the plate is facilitated.

In a meat-slitting machine of the type herein illustrated it is desirable that the knives should have a pulling or feeding action on the meat in order to assist in the feeding of the meat past the knives. To provide for this I propose to make some of the knives with radial slots 35 at their peripheries as shown with respect to the knives 4. These slotted knives have an increased frictional engagement over the non-slotted knives 3, and by using some slotted knives it is possible to increase the feeding effect of the knives on the meat so that even a fatty slice of meat will be properly fed through the machine by the rotary movement of the knives. This feature together with the improved meat-supporting plate provides a meat-slitting machine of this type in which the meat will always be securely retained on the plate and will also be properly fed through the machine by the rotation of the knives regardless of whether the slice of meat is lean or whether it contains gristly veins or whether it contains more or less fatty matter.

I claim:

1. A meat-supporting plate for a meat-slitting machine presenting on one side a smooth non-perforated face free from projections and adapted to have a free sliding movement over a supporting member of the slitting machine thereby to carry a slice of meat beneath the knives, the other side of said plate constituting a meat-supporting surface and being provided with a plurality of relatively small pockets into which the meat supported on the plate enters more or less, thereby increasing the frictional engagement of the meat with the plate, said plate comprising two members in superposed contacting relation, one of said members having an open-ended channel in each of two opposite edges and the other member having ribs slidably received in said channels whereby said members may be assembled or dissembled by sliding one on the other, one of said members being nonperforated and providing the smooth nonperforated face, and the other member being perforated and the perforations thereof providing the meat-engaging pockets.

2. A meat-supporting plate for a meat-slitting machine presenting on one side a smooth non-perforated face free from projections and adapted to have a free sliding movement over a supporting member of the slitting machine thereby to carry a slice of meat beneath the knives, the other side of said plate constituting a meat-supporting surface and being provided with a plurality of relatively small pockets into which the meat supported on the plate enters more or less, thereby increasing the frictional engagement of the meat with the plate, said plate comprising two members in superposed contacting relation, one of said members being nonperforated and providing the smooth nonperforated surface for the plate and the other member being perforated and the perforations providing the meat-engaging pockets on the meat-supporting face, said members having interengaging portions along two opposite edges constructed to permit the members to be assembled or dissembled by a relative sliding movement.

JOSEPH P. SPANG.